P. M. LINCOLN.
SYSTEM OF ELECTRICAL DISTRIBUTION
APPLICATION FILED JAN. 30, 1909.

1,013,186.

Patented Jan. 2, 1912.

WITNESSES:
Fred H Miller
R J Dearborn

INVENTOR
Paul M Lincoln
BY
Hurley S Carr
ATTORNEY

UNITED STATES PATENT OFFICE.

PAUL M. LINCOLN, OF PITTSBURGH, PENNSYLVANIA, ASSIGNOR TO WESTINGHOUSE ELECTRIC & MANUFACTURING COMPANY, A CORPORATION OF PENNSYLVANIA.

SYSTEM OF ELECTRICAL DISTRIBUTION.

1,013,186.  Specification of Letters Patent.  Patented Jan. 2, 1912.

Application filed January 30, 1909. Serial No. 475,225.

*To all whom it may concern:*

Be it known that I, PAUL M. LINCOLN, a citizen of the United States, and a resident of Pittsburgh, in the county of Allegheny and State of Pennsylvania, have invented a new and useful Improvement in Systems of Electrical Distribution, of which the following is a specification.

My invention relates to systems of transmission and distribution for electrical energy, and it has special reference to systems in which the energy is transmitted to numerous sub-stations at great distances from the generating station.
One of the objects of my invention is to provide improved means, in a system of the class above indicated, for automatically cutting out a section of the transmission circuit in case of a ground, a short circuit or other disturbance in said section.

Another object of my invention is to provide means for preventing injury to the low-voltage windings of transformers embodied in systems of distribution where the high-voltage windings of the transformers are connected to very long transmission lines in which static disturbances are liable to occur.

When a plurality of distant sub-stations are fed from a single generating station, a polyphase transmission line, arranged in the form of a loop, is sometimes utilized for connecting the generating station and all of the sub-stations together, and, under such conditions, it is desirable to cut out a section of the line without interrupting the supply of energy to any of the sub-stations whenever the transmission line is injured at any point between stations. According to my present invention, I provide means for automatically cutting out a predetermined section of the transmission line without necessarily interrupting the supply of energy to any of the sub-stations and, at the same time, rendering the injured section of the line dead in order that it may be safely and speedily repaired.

Figure 1:
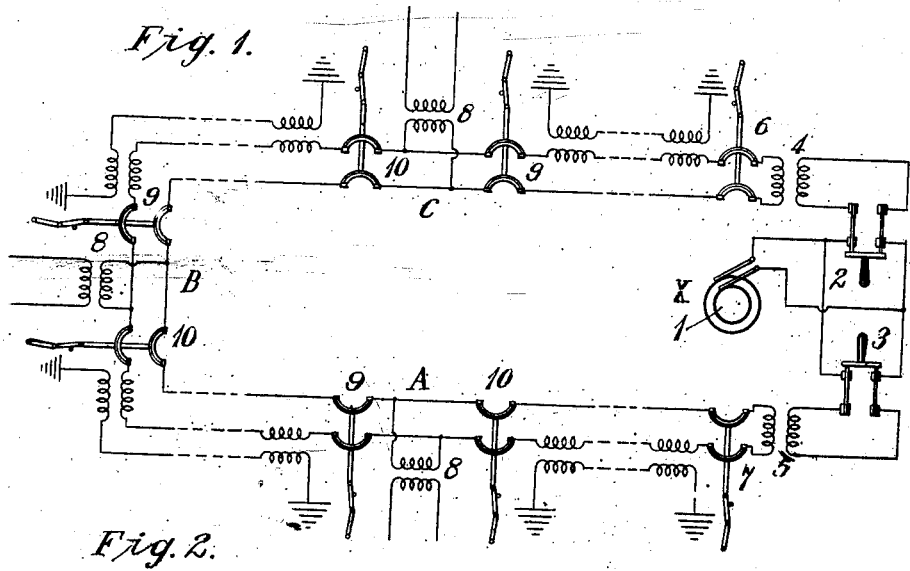
Figure 2:
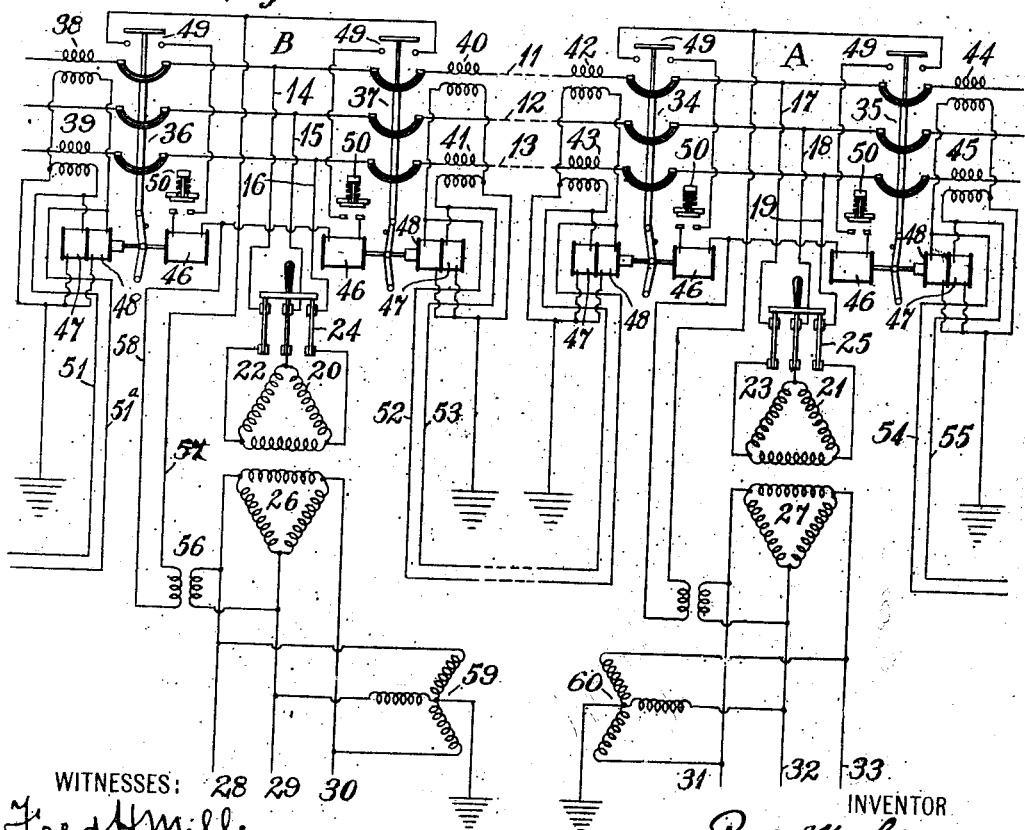

Figure 1 of the accompanying drawings is a diagrammatic view of a transmission system, the circuits of which are shown as single phase, for the sake of simplicity, and Fig. 2 is a diagrammatic view of a section including two adjacent sub-stations of the system illustrated in Fig. 1, the diagrams being illustrative of my system of distribution.

Referring to Fig. 1 of the drawings, a plurality of sub-stations A, B and C are supplied with energy from a main generating station X by means of a single-phase system of distribution, the circuits of which are connected in a closed loop. The generating station comprises a generator 1, a pair of station switches 2 and 3, step-up transformers 4 and 5 and automatic circuit interrupters 6 and 7. Each of the sub-stations A, B and C comprises a transformer 8 and a pair of automatic circuit interrupters 9 and 10, which are located at the respective sides of the transformer.

The operation of the system and the details of its auxiliary circuit connections may be readily understood from the diagram of Fig. 2, to which reference may now be had. In Fig. 2, three-phase transmission circuit conductors 11, 12 and 13, which correspond to the single-phase transmission line of Fig. 1, are shown. At distant points on the line conductors 11, 12 and 13, sub-station taps 14, 15 and 16 and 17, 18 and 19 are severally connected to primary windings 20 and 21 of the transformers 22 and 23, through switches 24 and 25. The secondary windings 26 and 27 of the transformers 22 and 23 are connected to low-voltage distributing circuits 28, 29 and 30, and 31, 32 and 33. In the sub-station A, circuit interrupters 34 and 35, corresponding to the interrupters 9 and 10 of Fig. 1, are located at the respective sides of the taps 17, 18 and 19. The sub-station B is similarly equipped with circuit interrupters 36 and 37, and, by this arrangement, the switches 24 and 25 may be opened, if it is desired to interrupt the supply of energy to any one sub-station, and adjacent circuit interrupters, corresponding to the interrupters 34 and 37, may be opened, if it is desired to cut out a section of the transmission line 11, 12 and 13, without interrupting the supply of energy to any of the sub-stations.

In order to render the system automatic, so that the proper circuit interrupters will be opened in case the transmission circuit is injured or grounded, I provide a plurality of series transformers 38, 39, 40 and 41 at the sub-station B and transformers 42, 43, 44 and 45 at the sub-station A. Each of the circuit interrupters is equipped with a closing coil 46 and a pair of trip coils 47 and 48. The circuit interrupters are also provided with auxiliary switches 49 and master controllers or push button switches 50. The coils 47 and 48 of the circuit interrupter 36 are respectively connected to corresponding terminals of the secondary windings of the transformers 39 and 38, the opposite terminals of the transformer secondary windings and the opposite terminals of the coils being connected to ground. The trip coils of the circuit interrupters 37 are similarly connected to the windings of the transformers 41 and 40, the coils of the interrupter 34 to the windings of the transformers 43 and 42 and the coils of the interrupter 35 to the windings of the transformers 45 and 44. The terminals of the trip coils which are joined to the transformers 38 and 39 are also connected by means of a plurality of auxiliary conductors 51 and 51ª to similar points on the trip coils of the adjacent circuit interrupter in the sub-station C. The corresponding terminals of the coils on the circuit interrupter 37 are connected through conductors 52 and 53 to the trip coils of the interrupter 34 and, similarly, the trip coils of the interrupter 35 are connected, through conductors 54 and 55, to corresponding trip coils on the main generating station interrupter which is adjacent to it.

The operation of the system is as follows: Assuming that the circuit interrupters are closed as indicated in the diagrams and that energy is being supplied from the generator 1, in different amounts, to the sub-stations A, B and C, it is evident that the amount of current traversing adjacent sets of the transformers, for example, the transformers 40 and 41, and 42 and 43, will be substantially the same, but if, for any reason, the transmission circuit should be grounded or short-circuited, it is evident that the currents traversing the transformers 40 and 42 or the currents traversing the transformers 41 and 43 would be opposed to each other and, consequently, either the trip coils 47 of the interrupters 37 and 34 or the trip coils 48 of these interrupters would be energized, as hereinafter explained. Under normal conditions, the arrangement of the circuit connections is such that the voltage generated in the secondaries of the transformers 40 and 41 is only required to force a current through the auxiliary conductors 52 and 53, since the resistance of the trip coils 47 and 48 is high, relative to that of the auxiliary conductors which are connected in shunt relation thereto. But when the main circuit conductors are grounded, the transformer secondary windings are opposed to each other and the effect is the same as if the auxiliary conductors were interrupted and the enhanced secondary voltage of the series transformers is utilized in energizing the trip coils of the respective circuit-breakers. Following the energization of the trip coils, the circuit interrupters 34 and 37 will be actuated and the section of the transmission line included between them will be cut out. By referring to the diagram of Fig. 1, it is evident that if the circuit interrupter 10 of the sub-station B and the circuit interrupter 9 of the sub-station A are opened, energy will still be supplied to both sub-stations by different routes but that a section of the loop is cut out.

While in the arrangement illustrated, each sub-station is equipped with two main line circuit interrupters, it may be preferable, in some cases, to supply only one, since the probability of frequently interrupting the circuit is remote. If only one interrupter is provided at each sub-station and the arrangement of series transformers is the same as before, it will then be possible to cut out a section of the line automatically by also cutting off the supply of energy to one of the sub-stations.

When the interrupters have been opened, for any reason, they may be closed by temporarily closing the corresponding push button switch 50. For example, if circuit interrupter 37 is opened, it may be closed by temporarily closing the push button switch 50 adjacent to it, which completes a circuit from any convenient source such as a small transformer 56 through a conductor 57, auxiliary switch 49 which is now closed, switch 50, closing coil 46 of the interrupter 37 and conductor 58, to the opposite terminals of the transformer. As the interrupter is closed, the auxiliary switch is opened, in a well known manner, in order to avoid the necessity for continually energizing the magnet coil 46.

In very high-voltage transmission systems, the neutral point of which is not grounded, it is very important to provide means for preventing the abnormal voltage increases in the secondary windings of transformers which are connected to the circuit. Should the high-potential line become grounded, even momentarily, the distribution of static potential in transformer windings causes a very marked potential disturbance in the low-voltage winding which might reach a voltage value several times greater than the normal potential of the low-voltage winding. In order to protect the transformer against disturbances of the character just referred to, I have provided star-connected transformers 59 and 60, the terminals of which are connected to the low-voltage distributing circuits of the sub-stations and the neutral points of which are grounded. It is preferable to make the transformers 59 and 60 of sufficient current-carrying capacity to trip the usual circuit interrupters (not shown) of the low-voltage circuit of the transmission system in the event of an abnormal disturbance upon the high-potential circuit.

Modifications in the circuit arrangement and connections may be effected without departing from the spirit and scope of my invention and those skilled in the art can readily adapt the improvements set forth above to transmission circuits which are supplied with either direct current energy or with single or polyphase alternating current energy.

I claim as my invention:

1. In a system of distribution, the combination with a source of energy, a high-voltage distributing circuit, a low-voltage receiving circuit and a transformer interposed between the two circuits and having a delta-connected secondary winding, of a star-connected auxiliary transformer connected to the receiving circuit and a ground connection to the neutral point of the auxiliary transformer.

2. In a system of distribution, the combination with a source of energy, a distributing circuit, a receiving circuit and a transformer interposed between the two circuits and having its neutral point outside of its windings, of an auxiliary transformer connected to the receiving circuit and having a neutral point in its winding and a ground connection to said neutral point.

In testimony whereof, I have hereunto subscribed my name this 18th day of Jan., 1909.

PAUL M. LINCOLN.

Witnesses:
  EMMA V. HARRIS,
  B. B. HINES.